US007846996B2

(12) United States Patent
Pask et al.

(10) Patent No.: US 7,846,996 B2
(45) Date of Patent: Dec. 7, 2010

(54) POLYMER CONCENTRATES WITH IMPROVED PROCESSABILITY

(75) Inventors: Stephen Pask, Dormagen (DE); Andre Damman, Köln (DE); Stephan Schroeder, Leverkusen (DE)

(73) Assignee: LANXESS Deutschland GmbH, Leverkusen, DE (US)

( * ) Notice: Subject to any disclaimer, the term of this patent is extended or adjusted under 35 U.S.C. 154(b) by 699 days.

(21) Appl. No.: 11/602,779

(22) Filed: Nov. 21, 2006

(65) Prior Publication Data

US 2007/0173566 A1 Jul. 26, 2007

(30) Foreign Application Priority Data

Nov. 26, 2005 (EP) .................................. 05025846

(51) Int. Cl.
*C08J 3/20* (2006.01)
(52) U.S. Cl. ...................... 523/351; 524/405; 524/409; 524/410; 524/427; 524/430; 524/439; 524/524; 524/563; 524/570; 525/197
(58) Field of Classification Search ................. 524/425, 524/405, 409, 410, 427; 523/351
See application file for complete search history.

(56) References Cited

U.S. PATENT DOCUMENTS

| 3,567,669 | A |   | 3/1971 | Georgiana et al. |
| 3,663,674 | A |   | 5/1972 | Holiday |
| 4,263,196 | A | * | 4/1981 | Schumacher et al. ........ 524/423 |
| 4,377,650 | A | * | 3/1983 | Fischer ........................ 524/88 |
| 4,379,190 | A | * | 4/1983 | Schenck ....................... 428/95 |
| 4,403,007 | A | * | 9/1983 | Coughlin ...................... 428/95 |
| 4,742,107 | A | * | 5/1988 | Statz ........................... 524/449 |
| 4,849,134 | A |   | 7/1989 | Georlette et al. ............. 252/601 |
| 4,849,136 | A |   | 7/1989 | Saito et al. |
| 5,059,651 | A | * | 10/1991 | Ueno ......................... 524/424 |
| 5,306,739 | A | * | 4/1994 | Lucey ......................... 522/42 |
| 5,589,531 | A | * | 12/1996 | Menashi et al. ............. 524/409 |
| 5,710,202 | A | * | 1/1998 | Kuckro ....................... 524/405 |
| 6,472,042 | B1 | * | 10/2002 | Dibbern et al. .............. 428/95 |
| 2003/0158315 | A1 | * | 8/2003 | Herbiet et al. .............. 524/425 |

FOREIGN PATENT DOCUMENTS

GB          1259300     *   2/1972

* cited by examiner

*Primary Examiner*—Mark Eashoo
*Assistant Examiner*—Nicole M Buie-Hatcher
(74) *Attorney, Agent, or Firm*—Jennifer R. Seng

(57) ABSTRACT

New polymer concentrates on the basis of polymer additives, like e.g. fillers and flame-retardants, are provided which have in particular an increased bulk density compared to the polymer additives as such. This increased bulk density leads to a substantial improvement in the processability of such concentrates, their dispersibility during compounding and the properties of the resulting polymer compound. Processing improvements include less dust, faster processing and more homogeneous additive dispersion. The invention also provides a process for preparing such new polymer concentrates, a process for preparing polymer compounds containing the new polymer concentrates, the respective polymer compounds and a process for preparing formed parts thereof. Such formed parts have more uniform properties such as density, wall thickness, and in case of the flame-retardants more homogeneous and consistent flame retardancy.

3 Claims, 1 Drawing Sheet

POLYMER CONCENTRATES WITH IMPROVED PROCESSABILITY

This application claims the benefit of European Application No. 05025846.6 filed Nov. 26, 2005.

FIELD OF THE INVENTION

The present invention relates to new polymer concentrates containing (1) one or more polymer additive(s) and (2) one or more polymer(s) which comprise repeating units of ethylene, vinyl acetate and optionally one or more other monomers. The invention also relates to a process for preparing such new polymer concentrates, a process for preparing polymer compounds comprising the new polymer concentrates, the resulting polymer compounds, a process for preparing formed parts thereof and the formed parts.

BACKGROUND OF THE INVENTION

Mineral hydroxides are an important class of polymer fillers used in particular as flame retardants. Aluminium trihydroxide and magnesium dihydroxide are the major examples of this class of fillers. However, these hydroxides as well as other finely powdered polymer fillers or additives present problems in handling and particularly in compounding into polymers. Ideally, a finer particle size of solid polymer additives should lead to better dispersion in the polymer matrix, and better dispersion equates to more efficient, uniform performance and improved polymer physical properties. Therefore, the solid polymer additives often have particle sizes reduced to less than 10 µm. On the other hand, finer particles are often more difficult to disperse and problems of reagglomeration occur;

Additionally the general handling of finely powdered polymer additives presents particular problems. One substantial problem of finely powdered polymer additives is dusting. The creation of dust involves loss of raw material, increased clean-up costs, and health concerns for those handling the solids.

Another problem is bulk density. Finer solids tend to have decreased bulk density and increased packaging size, volume and cost. The fluffy nature and low bulk density of finely powdered polymer additive solids adversely affects additive flow properties, making them more difficult to meter when using continuous compounding equipment, such as twin screw extruders, but also making general handling difficult. More specifically, poor solids mixing homogeneity results in poor performance in general, for example poor physical properties in the final product. Finer solids tend to lead to, for example, poor physical properties in the final product.

One prior art approach to increasing the mixing homogeneity in the addition of low bulk density solids to polymers involves adding a liquid, such as a plasticizer, to the powder, prior to mixing the powder with the polymer.

Blending the additive powder into the polymer in the form of a masterbatch concentrate that can be diluted with more polymer to achieve the desired final concentration of powder additive is a further common approach. It decreases dusting during the ultimate polymer processing step. However, it not only adds a costly additional step, but it also does not deal with the problem of poor mixing of a low bulk density additive powder and a polymer in forming the masterbatch concentrate. In fact, the masterbatch sometimes has poorer homogeneity because a higher proportion of incompatible fine powder is added. This method also has a disadvantage for fillers which are used in substantially larger amounts, such as flame retardants, due to the large amount of polymer carrier that is included in the final compound.

The approach described in U.S. Pat. No. 4,849,134 to solving these problems is cold compaction of the filler. The disadvantage of this method is that compaction (re-)agglomerates the fine particles of the additive. Unless subsequent polymer processing conditions result in complete breakup of the coarse compacted, i.e. agglomerated particles and dispersion into the polymer, any advantage of the fine particles is lost.

The aim of increasing the bulk density of fine polymer fillers and in particular flame retardants, flame retardant synergists, blends thereof, and other powdered polymer additives has significant value. These additives are included in an amount of about 1% by weight to about 60% by weight, often 10-40% by weight, into a finished polymeric article.

Certain advantages of a lower bulk density polymer additive upon processing of one polymer, PVC, are referred to in U.S. Pat. No. 3,567,669. This patent discloses a high speed mixing process which requires a temperature of at least 170° F. Under these conditions, the PVC particles have a slightly sintered or glazed surface. Solid additives are absorbed or adsorbed onto the polymer surface.

U.S. Pat. No. 3,663,674 discloses densification of poly-α-olefins. Such poly-α-olefins are prepared in a dense granular form suitable for moulding or extrusion by the application of sufficient mechanical energy to compress and collapse the porous polymer particles recovered from the polymerisation reactor. Cited advantages of increased bulk density are improved handling characteristics and the lack of a thermal history prior to processing. No mention is made of the effect of the bulk density of powdered additives upon the processability or properties of the polymer. Nor is there any mention of the use of flame retardants or flame retardant synergists.

Based upon the teachings of the U.S. Pats. No. 3,567,669 and 3,663,674 it was therefore the object of the present invention to provide new concentrates of polymer additives, in particular fillers and flame-retardants, and polymers which new concentrates possess an enhanced processability, show an improved dispersability of the additive throughout the polymer and eventually result in improved properties of the formed parts prepared by processing polymer compounds containing the new concentrates.

SUMMARY OF THE INVENTION

The present invention is directed to a concentrate containing (1) one or more polymer additives and
(2) one or more polymers which comprise repeating units of ethylene, vinyl acetate and optionally one or more other monomers,
wherein
(a) the concentrate contains less than 10% b.w. of one or more polymers (2), based on the total weight of the polymer additive(s) (1) and the polymer(s) (2), and
(b) the concentrate is obtainable by mixing the polymer additive(s) (1) with a solution of the polymer(s) (2) in a solvent and removing the solvent,
(c) the mean primary particle size ("$d_{50}$") of the polymer additive(s) (1) prior to the mixing with the solution of the polymer(s) (2) is less than 10 µm and
(d) the concentrate has a bulk density which is at least 50% greater than that of the polymer additive(s) (1) prior to the mixing with the solution of the polymer(s) (2), wherein such bulk density is measured in accordance with DIN ISO 697 from Jan. 1984.

The present invention is further directed to a process for preparing the concentrates by mixing the polymer additives (1) with a solution of the polymer(s) (2) and removing the solvent.

Eventually the present invention is directed to the use of the inventive concentrates for preparing polymer compounds, to a process for preparing polymer compounds comprising the concentrates, a process for preparing formed parts on the basis of such polymer compounds and the formed parts.

BRIEF DESCRIPTION OF DRAWINGS

For a fuller understanding of the nature and advantages of the present invention, reference should be had to the following detailed description taken in connection with the accompanying drawings, in which.

DETAILED DESCRIPTION OF THE INVENTION

Figure 1:
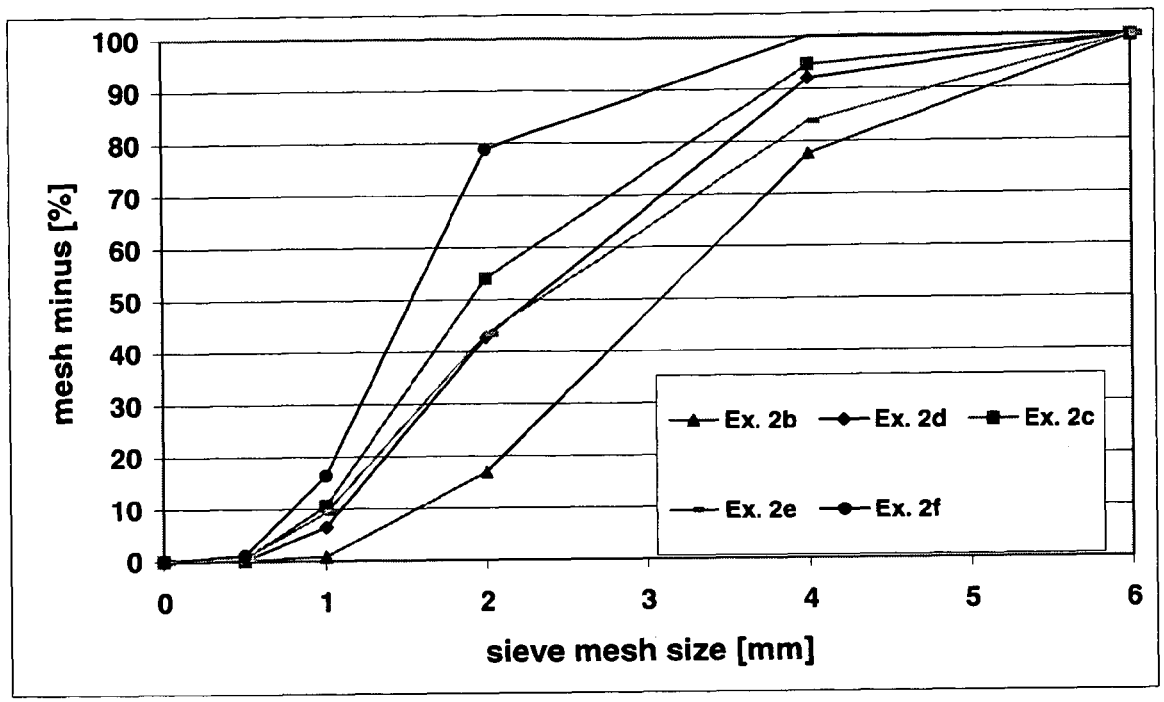
FIG. 1: is a chart of the particle size distributions for Examples 2b to 2f.

The polymer additive(s) (1) used to prepare the inventive concentrates have a finely powdered form. The mean primary particle size (also abbreviated as "$d_{50}$") of the polymer additive(s) (1) prior to subjecting the polymer additive(s) (1) to the preparation of the inventive concentrate is less than 10 µm, preferably less than 5 µm, particularly preferred less than 2.5 µm.

The term "mean primary particle size" ("$d_{50}$") means that at least 50% of the polymer additive particles have a particle size less than 10 µm, preferably less than 5 µm, and particularly preferred less than 2 µm, and most preferably 0.5-1.5 µm. This mean primary particle size is typically measured by laser diffraction e.g. by using a Malvern Mastersizer S.

The polymer additives (1) which may be used to prepare the inventive concentrates may be e.g. fillers, flame-retardants, flame-retardant synergists, pigments or other finely powdered polymer additives or any mixtures thereof. This includes mixtures of different types of polymer additives (1) may be used, e.g. a mixture of a filler and a flame-retardant or a mixture of a filler, a flame-retardant, and a flame-retardant synergist. Such polymer additives (1) are known and commercially available. Usually it is not necessary to further reduce the particle size of the polymer additives (1) available.

As flame-retardants aluminium trihydroxide (ATH), magnesium hydroxide, antimony trioxide, or mixtures thereof are e.g. suitable.

As flame-retardant synergists zinc borate, antimony trioxide, sodium antimonate, or mixtures thereof are suitable to additionally enhance the efficiency of the flame-retardant itself.

Suitable fillers subjected to the preparation of the inventive concentrates include carbon black, graphite, metal powders, talc, clays, mica, wollastonite, silica, calcium carbonate, hydrated minerals, boron-containing compounds, zinc-containing compounds, antimony-containing compounds, and mixtures thereof.

As pigments which can also be used in the present invention for example iron oxides and titanium dioxide are mentioned.

The polymer(s) (2) used to prepare the inventive concentrates comprise repeating units of ethylene, vinyl acetate and optionally one or more other monomers. Such polymers are commercially available and are typically produced by radical initiated polymerisation of ethylene, vinyl acetate and optionally one or more other monomers. Some commercial materials may also contain minor amounts of a third monomer such as acrylic acid or esters thereof. Such polymers are described in detail in Ullmann's Encyclopedia of Industrial Chemistry 5$^{th}$. Ed. 1993, VCH Verlagsgesellschaft, Vol. 23, page 241 ff and the references cited therein. In particular, these polymers can be prepared in solution, for example in tert. butanol or methanol. Before isolation of the polymer these processes yield a solution of polymer and unreacted monomer in the respective solvent. Such solutions may be also be used in order to prepare the inventive concentrates.

The polymers (2) used may contain 40 to 90% b.w., preferably 60 to 80% b.w. vinyl acetate and 10 to 60% b.w., preferably 20 to 40% b.w. ethylene. In said polymers a percentage of the vinyl acetate and/or ethylene may be replaced by one or more further monomers, e.g. 10 to 50% b.w. of one or more further monomers, wherein the sum of all monomers in the polymer(s) (2) still has to give 100% b.w.

Further monomer(s) encompass, but are not limited to, alkyl esters of unsaturated mono-or di-carboxylic acids. Fumaric or maleic acid mono-or di-ethyl esters are particularly suitable.

It is an important feature of the invention that the concentrate contains less than 10% b.w. of one or more polymers (2), based on the total weight of the polymer additive(s) (1) and the polymer(s) (2). Preferably the concentrate contains 2 to 10% b.w., particularly preferred 3 to 8% b.w. and most preferably 3 to 6% b.w. of one or more polymers (2), based on the total weight of the polymer additive(s) (1) and the polymer(s) (2).

The second object of this invention is a method of preparing such concentrates containing
(1) one or more polymer additives and
(2) one or more polymers which comprise repeating units of ethylene, vinyl acetate and optionally one or more other monomers, comprising
  mixing the polymer additive(s) (1) with a solution of the polymer(s) (2) in a solvent, wherein the polymer additive(s) (1) have a mean primary particle size ("$d_{50}$") of less than 10 µm prior to the mixing with the solution of the polymer(s) (2), and
  removing the solvent, wherein the concentrate has a bulk density which is at least 50% greater than that of the polymer additive(s) (1) prior to the mixing with the solution of the polymer(s) (2).

The polymer(s) (2) are used in a solution to prepare the inventive concentrates. Solvents which are typically used to prepare the solution of the polymer(s) (2) are organic solvents like e.g. methanol, tert. butanol, toluene or methyl acetate. Typically the solution of the polymer(s) (2) contains 70-99%. b.w of the solvent and 1-30% b.w. of the polymer(s), based on the total amount of solvent and polymer(s), preferably 80-98% b.w. of the solvent and 2-20% b.w. of the polymer(s). Additionally the solution of the polymer(s) may contain from 2-20% b.w., preferably 4-10% b.w. of vinylacetate, based on the total amount of solvent, polymer(s) and vinylacetate.

In the next step the solvent is removed. Typically other volatiles may be also removed together with the solvent.

To prepare the concentrate of the polymer additive(s) (1), preferably the fillers, flame-retardants, flame-retardant synergists, pigments, other finely powdered polymer additives or any mixtures thereof, and the solution of the polymer(s) (2) different processes can be used, especially in order to get a better redispersibility, higher bulk density, less trapped air, less dusting properties and better flowability compared with the typically fine powder of fillers known as state of the art. The processes which are suitable differ in the amount of solvent in the solution of the polymer(s) (2) that is used and which therefore has to be removed in the second step from the solid granules, pellets or tablets. For each process and the properties of the resulting granules, pellets or tablets the amount of polymer remaining as binder in the granules, pellets or tablets as well as the amount of solvent initially present as moisture for plastizising, dispersing and granulating, each related to the total amount of solids employed, determine the economics of the process as well as the particular method used and the properties of the final granules, pellets or tablets.

The first process alternative of mixing the solid powder particles of the polymer additive(s) (1) with the solution of the polymer(s) (2) is to disperse the solid powder particles of the polymer additive(s) (1) in the polymer solution by preparing a suspension in a stirred vessel or even with additional deagglomeration forces for the solid powder particles. Processes to be used for dispersing the solid powder particles of the polymer additive (1) can be different types of stirrers (e.g. propeller, horseshoe, helix, tooth wheel), high shear dispersing units (e.g. rotor-stator-mixers batch or continuous, colloid mills, corrundum disk mills), continuous powder dispersing units (e.g. jet pumps, powder draw in with rotor stator systems) or high energy systems such as a jet disperser, ultrasonic systems, roller mills or stirred media mills.

With these dispersing units the total solids content (this shall mean by definition the sum of the polymer additive(s) (1) and the polymer(s) (2)), is 5-80% b.w., preferably 10-70% b.w. and particularly preferred 20-60%, based on the total weight of the solution of the polymer(s) (2) and the polymer additives (1).

Subsequent to the dispersing step the granules, pellets or tablets have to be formed either in an integrated shaping and drying step such as fluidized bed granulation, spray granulation, vacuum drying in a mixer granulator or in a drying step such as spray drying or vacuum drying with a subsequent granulating step such as roller compaction or tableting.

Using the second process alternative less amount of solvent is needed: High shear machines for moist powders, pastes or suspensions are used in this case. Typical machines are extruders such as single screw extruders, parallel rotating or counter rotating, twin screw extruders or planetary extruders and kneaders such as co-kneaders or sigma-kneaders as well as other batch or continuous kneaders. With these machines, under high shear conditions, the solid powder particles of the polymer additives (2) can be dispersed in the solution of the polymer(s) (1) and subsequently the mixture can be shaped by an integrated granulation or a further shaping step such as low pressure extrusion with frontal, radial or dome extrusion, pelletizing or granulating from the moist state of product. Such dispersing units work with total solid contents of 5-99% b.w., preferably 50-95% b.w. and particularly preferred 55-90% b.w. based on the total weight of the solution of the polymer(s) (2) and the polymer additives (1).

The third and very effective process alternative to obtain granules, which generally employs even less solvent, is growth agglomeration by roll agglomeration or high shear agglomeration or combinations thereof. These processes work by moving the powdered particles of the polymer additive(s) (1) e.g. in a vessel, on a pelletizer plate or in a mixing chamber. The solution of the polymer(s) (2) is then added either at once as a batch, in a flow, as a semibatch or continuously, by spraying either semibatchwise or continuously. Under more or less intensive mixing the powder particles agglomerate by means of fluid bridges and a growth agglomeration results.

Depending on the particular process which is used for this third alternative a more or less narrow particle size distribution results which can be classified if desired in an integrated or subsequent classifying process. The granulation process itself needs relatively small amounts of the solution of the polymer(s) (2). This third process alternative can be carried out with a total solid content of 20-99% b.w., preferably 50-95% b.w. and particularly preferred 60-90% b.w., based on the total weight of the solution of the polymer(s) (2) and the polymer additives (1).

A very small amount of solvent is possible, when using the affinity of the fine powder of the polymer additives (1) to agglomerate because of its surface forces. The affinity can be intensified and the stability of the resulting granules improved by moistening the solid powder of the polymer additives (1) with a very small amount of polymer solution at the beginning. The subsequent granulating process either can be a growth agglomeration or a dry pressure agglomeration e.g. roller compacting or tableting.

For most applications of the inventive concentrates in the form of granules the granules are required to be essentially solvent free. How the solvent is removed depends on the form of the moist product after dispersion and/or granulation. Due to the necessity to ensure that no explosion can occur vacuum drying is often used but also convective heat and mass transfer by static or vibrating fluidized bed drying (fluidized bed), spray drying, continuous-flow drying, flash drying or radiation dryers are possible. Depending on the acceptable residual solvent a post drying process (e.g. after a gentle convective drying process to obtain granules of a certain strength) may be necessary. The concentrate may be also subjected to a classifying, if this is deemed helpful.

Also a spheronising step before or after drying may be helpful, e.g. in order to improve the flow behaviour of the granules, pellets or tablets or to improve the particle size distribution as well as to abrade the rough edges remaining after the granules, pellets or tablets have been formed and dried. Such a step also reduces the dusting of the resulting product.

The preparation of granules, pellets or tablets and their characterisation is described in an article by M. Müller, Aufbereitungstechnik, 44, (2003), Nr. 2, page 22 ff and in an article by Nold, Löbe and Müller, Interceram, 53, (2004), Nr. 2, page 96 ff.

It is a decisive feature of the inventive concentrate, of course after the removal of the solvent, that it has a bulk density which is at least 50% greater than the one which the polymer additive(s) (1) have prior to the mixing with the solution of the polymer(s) (2). This means that the present invention allows the preparation of solid concentrates with a high bulk density. Preferably the bulk density of the inventive concentrate is at least 100% greater than the one which the polymer additive(s) (1) have prior to the mixing with the solution of the polymer(s) (2).

The bulk density is measured in accordance with DIN ISO 697 from Jan. 1984.

The invention is further directed to the use of the inventive concentrates for preparing polymer compounds and to a process of preparing such polymer compounds containing the concentrates.

Such process of preparing polymer compounds containing the inventive concentrates comprises mixing the inventive concentrates with one or more polymers (3).

Such polymers (3) encompass, but not limited to, nitrile rubber (also abbreviated as "NBR"), hydrogenated nitrile rubber (also abbreviated as "HNBR"), polyamides, polycarbonate, polyvinylchloride ("PVC"), AEM and EVM. All such polymers (3) are well-known and either commercially available or may be prepared by a person skilled in the art based on known synthesis or manufacturing processes.

As used throughout this specification, the term "nitrile rubber" or "NBR" is intended to have a broad meaning and is meant to encompass an elastomer having repeating units derived from at least one conjugated diene, at least one alpha-beta-unsaturated nitrile, and optionally further one or more copolymerizable monomers.

The conjugated diene may be any known conjugated diene, preferably a $C_4$-$C_6$ conjugated diene. Preferred conjugated dienes are butadiene, isoprene, piperylene, 2,3-dimethyl butadiene and mixtures thereof. Even more preferred $C_4$-$C_6$ conjugated dienes are butadiene, isoprene and mixtures thereof. The most preferred $C_4$-$C_6$ conjugated diene is butadiene.

The alpha-beta-unsaturated nitrite may be any known alpha-beta-unsaturated nitrite, preferably a $C_3$-$C_5$ alpha-beta-unsaturated nitrite. Preferred $C_3$-$C_5$ alpha-beta-unsaturated nitrites are acrylonitrile, methacrylonitrile, ethacrylonitrile and mixtures thereof. The most preferred $C_3$-$C_5$ alpha-beta-unsaturated nitrite is acrylonitrile.

Preferably, the copolymer contains in the range of from 40 to 85% b.w. of repeating units derived from one or more conjugated dienes, in the range of from 15 to 60 weight percent of repeating units derived from one or more alpha-beta-unsaturated nitrites. More preferably, the copolymer contains in the range of from 55 to 75 weight percent of repeating units derived from one or more conjugated dienes, in the range of from 25 to 40 weight percent of repeating units derived from one or more alpha-beta-unsaturated nitrites.

Optionally, the copolymer may further contain repeating units derived from one or more copolymerizable monomers, such as unsaturated carboxylic acids, alkyl acrylates and/or styrene. Repeating units derived from one or more copolymerizable monomers will replace either the nitrile or the diene portion of the nitrile rubber and it will be apparent to the skilled in the art that the above mentioned figures will have to be adjusted to result in 100% b.w.

The "hydrogenated nitrile rubber" or "HNBR" means that the residual double bonds (RDB) present in the starting nitrile polymer/NBR are hydrogenated to a certain extent, typically more than 50% of the residual double bonds are hydrogenated, preferably more than 90%, more preferably more than 95% and most preferably more than 99% of the residual double bonds are hydrogenated.

The term "polyamide" shall encompass homo-or copolymers which contain monomer repeating unit, which are linked by amide groups (—C(=O)—NH—). Examples of such polyamides cover polycaprolactam (nylon 6), polylaurolactam (nylon 12), polyhexamethylenadipate (nylon 6,6). polyhexamethylenazelamide (nylon 6,9), Polyhexamethylensebacamide (nylon 6,10), polyhexamethylenisophthalamide (nylon 6, IP), polyaminoundecansäure (nylon 11), Polytetramethylenadipamide (nylon 4,6) as well as copolymers of caprolactame, hexamethylendiamine and adipic acid (nylon 6,6) and aramides like e.g. polyparaphenylenterephthalamide.

The term "polycarbonate" shall encompass the group of thermoplastic materials which can be formally considered to be a polyester from carbonic acid and aliphatic or aromatic dihydroxyl moieties. Economically the most important example are the polycarbonate produced from bisphenol A (2,2-(4,4-dihydroxy-diphenyl)-propane) and phosgene, but for particular properties other dihydroxy-diaryl-alkanes as well as other dihydroxy aromatic or aliphatic moieties can be included during the manufacturing process.

"Polyvinylchloride" or "PVC" shall be assumed to mean those polymers prepared by either suspension, emulsion or bulk polymerisation processes and based formally on the monomeric unit $CH_2$—CHCl. Those polymers commercially available can also contain conmonomers such as vinyl acetate, vinylidene chloride or acrylonitrile. Additionally, PVC is also available which has been chlorinated after polymerisation and these polymers too are included within the scope of the present invention.

"Polyacrylates" or "AEM" is used herein to mean the polymers produced by an emulsion (co)polymerisation of, but not limited to, one or more of the following monomers: ethyl acrylate, butyl acrylate, methoxyethyl acrylate, ethoxyethyl acrylate, caprolacton acrylate, 2-chloroethyl vinyl ether, vinyl chloroacetate, p-vinyl benyl chloride, allyl glycidyl ether, glycidyl methacrylate, acrylic acid and methacrylic acid.

Eventually the invention concerns the polymer compounds containing the inventive concentrates and one or more polymers (3), a process for preparing such polymer compounds as well as the formed parts manufactured from the polymer compounds.

The preparation of the polymer compounds is typically achieved by compounding the concentrates of the present invention with one or more polymers (3). This compounding can be done by using for example an internal mixer, a mixing extruder, such as a twin screw extruder or a bus co-kneader.

The polymer compounds containing the inventive concentrates can be used for preparing formed parts thereof. Such formed parts may be profiles such as sealing profiles or such as window profiles, equipment housings such as for computers and household or industrial electrical equipment, and for functional articles such as hoses and belts.

Such formed parts can be formed by extrusion, injection moulding or compression moulding techniques and may be vulcanised (crosslinked) after forming to improve the mechanical properties of the finished articles.

The concentrates obtained by the process of this invention can be described as low dusting during processing and are easy to meter and handle. They maintain the fine particle size, and nevertheless show low dusting. When being used for preparing polymer compounds, they are dispersed in the polymer faster and more efficient than the untreated polymer additive(s) and yield polymer compounds having improved performance due to the more uniform and homogeneous incorporation of the polymer additive(s). Such increase of the compounding speed enhances the commercial attractiveness of the processing.

Formed parts containing the inventive concentrates are more uniform with respect to density, wall thickness, and more homogeneous compared to formed parts known so far. Physical properties such as flammability test performance and/or impact strength also are enhanced.

Those skilled in the art would not have expected that increasing the bulk density of the specific polymer additives (1) by transferring them into the inventive concentrates would enhance the processability, achieve better dispersion of the additive throughout the polymer, or enhance the properties of the processed polymer compound.

EXAMPLES

The concentrates of the present invention can be characterised visually to determine their tendency to form dust. A quantitative indication of the tendency to form dust can be derived from a sieve analysis.

The bulk density can be measured according to DIN ISO 697 from Jan. 1984.

The quality of the dispersion of the polymer additives (1), in particular of fillers, in polymers and, in particular, in rubber can be measured by the shear modulus at varying amplitudes as described in A. R. Payne, R. E. Whittacker, Rubber Chem. Technol. 44, 440 (1971).

In the Examples $Mg(OH)_2$ was used as polymer additive (1), which has the trade name Magnifin® H10A (Fa. Martinswerk, Germany) and a mean primary particle size ($d_{50}$) of 0.65-0.95 μm measured by laser diffraction using a MALVERN MASTERSIZER S.

Examples 1a-d

Preparing an inventive concentrate in the form of fine granules by dispersing as a polymer additive (1) a flame retardant in an organic polymer-solution and vacuum drying of the granules Example 1a In a first example 1a 95 g of the flame retardant $Mg(OH)_2$, (Magnifin® H10A, Fa. Martinswerk) was dispersed in 155 g of a solution containing 95 vol.-% of tert. butanol, 5 vol.-% vinyl acetate and 5 g of an ethylene vinyl acetate copolymer itself containing 70% b.w. vinyl acetate and 30% b.w. ethylene (Levapren®700, Lanxess Deutschland GmbH, Germany). The flame retardant was dispersed by a batch lab disperser (Ultraturrax T18, Fa. IKA, Germany) for 5 minutes resulting in an increase of temperature of 10° C. The resulting suspension had a solid content of 40% b.w. After dispersion, the suspension was dried at 20° C. in a lab extractor hood to yield a thick, solvent containing, paste which was then vacuum dried at 40° C. for 48 h. The resulting fine granules of $Mg(OH)_2$ contained 5% b.w. ethylene vinyl acetate copolymer.

This procedure was repeated for the following examples all employing $Mg(OH)_2$ as a filler (Magnifin® H10A, Fa. Martinswerk) and the copolymer used in Example 1 a.:

Example 1b 90 g of filler, 160 g of a solvent mixture (95 vol. % of tert. butanol and 5 vol. % of vinyl acetate), 10 g of ethylene vinyl acetate copolymer.

Example 1c 98 g of filler, 152 g of a solvent mixture (95 vol. % of tert. Butanol and 5 vol. % of vinyl acetate), 2 g of ethylene vinyl acetate copolymer Example 1d 99 g of filler, 151 g of a solvent mixture (95 vol. % of tert. Butanol and 5 vol. % of vinyl acetate), 1 g of ethylene vinyl acetate copolymer Examples 2a-f Preparing an inventive concentrate in the form of coarser granules by agglomerating as a polymer additive a flame retardant with an organic binder solution containing an ethylene vinyl acetate copolymer and vacuum drying of granules.

In a second example coarse granules were produced by growth agglomeration in an intensive mixer (Eirich-Mixer R02, Fa. Eirich, Hardheim, Germany).

Example 2a 1000 g of flame retardant $Mg(OH)_2$ (Magnifin® H10A, Fa. Martinswerk, Germany) was placed in an "Eirich-Mixer". The mixing was carried out under a blanket of nitrogen (Level 1 of mixer vessel, 1500 U/min of a pin mixing tool). 350 g of polymer solution containing 85.5% b.w. of tert. butanol, 4.5% b.w. vinyl acetate and 10% b.w. of an ethylene vinyl acetate copolymer, itself containing 70% b.w. vinyl acetate and 30% b.w. ethylene (Levapren®700, Lanxess Deutschland GmbH) was added in 3:30 min by a flexible tube pump to the dry powder. While the solution was added the granules grew and after a further 5 min of post mixing the granules were modified to a more narrow particle size distribution.

The granules were then dried at 20° C. in a lab extractor hood for 24 h and finally vacuum dried for 48 h at 40° C.

The resulting coarse granules contained 3.6% b.w. ethylene vinyl acetate copolymer.

This procedure was repeated for the following examples all employing as a filler $Mg(OH)_2$ (Magnifin® H10A, Fa. Martinswerk) and the copolymer used in Example 2 a:

Example 2b 1000 g of filler, 350 g polymer solution with 89.6% b.w. tert. butanol, 4.7% b.w. vinyl acetate and 5.7% b.w. ethylene vinyl acetate copolymer; mixing conditions: mixer vessel level 1, mixing tool 750 U/min Example 2c 1000 g of filler, 350 g polymer solution with 81.4% b.w. tert. Butanol, 4.3% b.w. vinyl acetate and 14.3% b.w. ethylene vinyl acetate copolymer; mixing conditions: mixer vessel level 1, mixing tool 750 U/min Example 2d 1000 g of filler, 350 g polymer solution with 85.5% b.w. tert. Butanol, 4.5% b.w. vinyl acetate and 10% b.w. ethylene vinyl acetate copolymer; mixing conditions: mixer vessel level 1, mixing tool 750 U/min Example 2e 1000 g of filler, 350 g polymer solution with 85.5% b.w. tert. Butanol, 4.5% b.w vinyl acetate and 10% b.w. ethylene vinyl acetate copolymer; mixing conditions: mixer vessel level 1, mixing tool 1500 U/min Example 2f 1000 g of filler, 350 g polymer solution with 85.5% b.w. tert. Butanol, 4.5% b.w. vinyl acetate and 10% b.w. ethylene vinyl acetate copolymer; mixing conditions: mixer vessel level 1, mixing tool 3000 U/min The products from Examples 2b-2e were analysed by sieve analysis (vibrating lab sieve, 100 g, 30% intensity, 10 min) to determine their particle size distribution, but also to determine their fines content which is an objective measure of their dusting characteristic.

All products had <1 wt.-% fines after drying; they did not dust when shaken.

The particle size distributions are shown in the following Table 1 and in FIG. 1.

TABLE 1

| | Example | | | | |
|---|---|---|---|---|---|
| | 2b | 2c | 2d | 2e | 2f |
| | Sieved Fraction/% | | | | |
| >4 mm | 22.2 | 5.3 | 7.9 | 16.2 | 0 |
| 2-4 mm | 60.8 | 40.6 | 49.3 | 40.4 | 21.2 |
| 1-2 mm | 16.1 | 43.5 | 36.3 | 34.1 | 62.5 |
| 0.5-1 mm | 0.7 | 10.2 | 6.4 | 8.7 | 15.3 |
| <0.5 mm | 0.1 | 0.4 | 0.1 | 0.6 | 1.1 |

TABLE 2

Measurement of the bulk density of the granules of Examples 1 and 2 in accordance with DIN ISO 697 from January 1984.

| Trial | Parameters | Sieve fraction * | EVA [% b.w.] | bulk density [g/l] |
|---|---|---|---|---|
| Comparative Example (Magnifin ® H10A) | No mixing, analysed as received | As received | 0 | 300 |
| Example 2b | Eirich-Mixer, 750 rpm | no Classification after Granulation | 2 | 825 |
| Example 2c | Eirich-Mixer, 750 rpm | no Classification after Granulation | 4.8 | 865 |
| Example 2d | Eirich-Mixer, 750 rpm | no Classification after Granulation | 3.4 | 855 |
| Example 2e | Eirich-Mixer, 1500 rpm | no Classification after Granulation | 3.4 | 845 |
| Example 2f | Eirich-Mixer, 3000 rpm | no Classification after Granulation | 3.4 | 800 |
| Example 2b | Eirich-Mixer, 750 rpm | Classifying fraction 2-4 mm | 2 | 685 |
| Example 2c | Eirich-Mixer, 750 rpm | Classifying fraction 2-4 mm | 4.8 | 740 |
| Example 2d | Eirich-Mixer, 750 rpm | Classifying fraction 2-4 mm | 3.4 | 725 |
| Example 2e | Eirich-Mixer, 1500 rpm | Classifying fraction 2-4 mm | 3.4 | 745 |
| Example 2f | Eirich-Mixer, 3000 rpm | Classifying fraction 2-4 mm | 3.4 | 670 |
| Example 1a | Ultra-Turrax T18, 20.000 rpm | no Classification after Granulation | 5 | 485 |
| Example 1c | Ultra-Turrax T18, 20.000 rpm | no Classification after Granulation | 2 | 480 |

* Column "Sieve Fraction"
The entry "no Classification after Granulation" under "Sieve Fraction" means that the product as obtained after granulation was directly subjected to the measurement of the bulk density.
The entry "Classifying fraction 2-4 mm" under "Sieve Fraction" means that the product obtained after granulation was subjected to a classifying at first and the fraction obtained therefrom which had a particle size of 2-4 mm was then subjected to the measurement of the bulk density.

Example 4

Processing the Granules from Examples 1 and 2 in a Polymer on a Two Roll Mill

The concentrates from Examples 1 and 2, as well as untreated $Mg(OH)_2$ (comparative example) were mixed with an ethylene vinyl acetate copolymer to produce a visually homogeneous sheet on a laboratory two roll mill. The time taken to produce the apparently homogeneous sheet was recorded.

The two roll mill (LaboWalz W80T; Vogt Maschinenbau GmbH) used had the following specifications:
Roll diameter: 80 mm, Roll breadth: 280 mm, Roll speed: front: 16.5 Upm, back: 20 Upm,
Friction: 1:1.2, Set temperature: 20° C.

For each experiment 50 g ethylene vinyl acetate copolymer (Levapren®700, Lanxess Deutschland GmbH, Germany) was put on the mill and a continuous sheet formed. Thereafter, either the untreated filler ($Mg(OH)_2$) or the inventive concentrate was added as rapidly as possible. For the untreated filler the distance between the rolls (the nip) had to be reduced to 0.5 mm in order to maintain the majority of the powder in the bank of rubber in the nip. For all other experiments the nip was maintained at 0.7 mm.

The sheets from these experiments were used to measure the shear modulus at varying amplitudes and at a constant frequency of 10 Hz, a temperature of 60° C. using a Rubber Process Analyser (RPA 2000) made by Alpha Technology. The limiting shear modulus at zero amplitude can be seen as a measure of the quality of the dispersion of fillers in a rubber matrix. The results as given in Table 2 below clearly show that the limiting shear modulus at zero amplitude is substantially lower and therefore the dispersion of the filler in the matrix considered better, if the additive is not used untreated but in the form of the inventive concentrates.

TABLE 3

| | Time to visual incorporation | Limiting Shear Modulus/kPa |
|---|---|---|
| Untreated Filler* | 490 s | 900 |
| Example 1a | 240 s | 730 |
| Example 1c | 260 s | 740 |
| Example 2d | 360 s | 700 |
| Example 2c | 315 s | 700 |
| Example 2b | 375 s | 780 |
| Example 2e | 405 s | 725 |
| Example 2f | 470 s | 750 |
| Levapren 700** | — | 195 |

*For comparison: $Mg(OH)_2$ as Magnifin ® H10A, Fa. Martinswerk
**For comparison, Levapren ®700 (Lanxess Deutschland GmbH, Germany) was solely used.

What is claimed is:

1. A method of preparing concentrates containing
   (1) one or more polymer additives and
   (2) one or more polymers which comprise repeating units of ethylene, vinyl acetate and optionally one or more other monomers, comprising mixing the polymer additive(s) (1) with a solution of the polymer(s) (2) in a solvent, wherein the polymer additive(s) (1) have a mean primary particle size, "$d_{50}$" of less than 10 μm prior to the mixing with the solution of the polymer(s) (2), and removing the solvent, wherein the concentrate has a bulk density which is at least 50% greater than that of the polymer additive(s) (1) prior to the mixing with the solution of the polymer(s) (2)

wherein the polymer(s) (2) contain 60 to 80% by weight vinyl acetate and 20 to 40% by weight ethylene and optionally one or more further monomers, wherein the sum of all monomers in the polymer(s) (2) still has to give 100% by weight.

2. The method according to claim 1, wherein as solvent an organic solvent is used and wherein the solution of the polymer(s) (2) contains 70-99%.b.w of the solvent and 1 -30% b.w. of the polymer(s), based on the total amount of solvent and polymer(s), and optionally from 2-20% by weight of vinyl acetate, based on the total amount of solvent, polymer(s) and vinyl acetate.

3. The method according to claim 1, wherein as solvent methanol, tert. butanol, toluene or methyl acetate is used and wherein the solution of the polymer(s) (2) contains 80-98% by weight of the solvent and 2-20% by weight of the polymer(s), and optionally from 4-10% by weight of vinyl acetate, based on the total amount of solvent, polymer(s) and vinyl acetate.

* * * * *